United States Patent Office 3,496,174
Patented Feb. 17, 1970

3,496,174
ANTHRAQUINONYL-TRIAZINE OR -PYRIMIDINE DYESTUFFS
Dennis Eckersley and Robert Norman Heslop, Manchester, England, assignors to Imperial Chemical Industries Limited, London, England, a corporation of Great Britain
No Drawing. Filed Nov. 13, 1967, Ser. No. 682,505
Claims priority, application Great Britain, Nov. 29, 1966, 53,435/66
Int. Cl. C07d 55/48, 51/42
U.S. Cl. 260—249                4 Claims

ABSTRACT OF THE DISCLOSURE

The reaction products of cyanuric chloride, 2,4,5,6-tetrachloropyrimidine, 5 - cyano-2,4,6-trichloropyrimidine or the analogous bromo compounds with (1) a 1-amino-2-sulpho-4-(aminoanilino) anthraquinone in which the 2,6 positions of the anilino radical are substituted with alkyl or halogen and (2) an aniline or naphthylamine containing an alkyl sulphamyl group in which alkyl group contains a Cl or Br atom or sulphato group in the β position or Cl, Br or OH in the β position together with Cl or Br in the γ position; these products are very bright reddish-blue cellulose-reactive dyes having a very high percentage fixation on the fibre.

---

This invention relates to new water-soluble reactive anthraquinone dyestuffs, to the methods of preparation thereof and to the use of such dyestuffs for colouring textile materials.

It is known to use dyestuffs containing halogeno-s-triazine or halogeno pyrimidine groups for the purpose of colouring fibres containing hydroxyl groups, especially cellulose materials such as cotton and viscose rayon.

These dyestuffs readily fix on such materials with good fastness to wet processing, since the halogen atom on the s-triazine or pyrimidine nucleus is able to react with hydroxyl groups of the cellulose molecule in the presence of acid-binding agents, especially at elevated temperatures. For this purpose, the dyestuffs are applied from aqueous solution or aqueous printing pastes and, owing to a side-reaction in which the halogen atom reacts with water instead of the cellulose molecule, a considerable portion of the dyestuff does not fix on the fibre.

Consequently an excess of dyestuff must be used and the dyeings or prints must be thoroughly washed with boiling soap solutions to remove the unfixed dyestuff. The wastage of dyestuff and extra processing make the dyeing or printing process more expensive especially when deep shades are required.

The present invention is concerned with the production of water-soluble halogeno-s-triazine and halogeno pyrimidine reactive dyestuffs which have a remarkably high fixation on the fibre and for which washing-off treatments can be reduced considerably.

According to the invention there are provided reactive water-soluble anthraquinone dyestuffs of the formula:

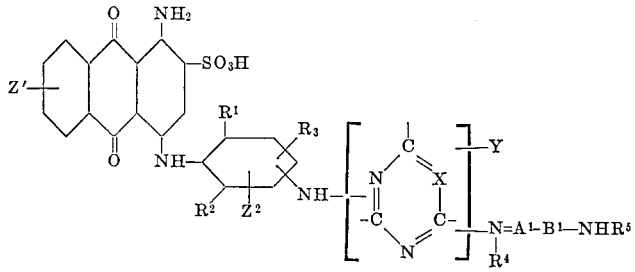
(1)

wherein $Z'$ and $Z^2$ each independently represents H or $SO_3H$;
$R^1$ is methyl or ethyl,
$R^2$ represents a chlorine or bromine atom or methyl or ethyl group,
$R^3$ represents a hydrogen atom or a methyl or ethyl group,
Y represents Cl or Br;
X represents N, C—Cl or C—CN,
$R^4$ represents a hydrogen or an alkyl group having up to 4 carbon atoms,
$A^1$ represents a phenylene or naphthylene radical in which the nucleus can carry one or more substituents,
$B^1$ represents $SO_2$ or $CO_2$, and
$R^5$ represents an alkyl group of at least 2 carbon atoms, having a Cl, Br or $OSO_3H$ substituent in the β-position or having both a Cl, Br or OH substituent in the β-position and a Cl or Br substituent in the γ position.

In the above formula, $Z'$ preferably represents hydrogen; $R'$, $R^2$ and $R^3$ preferably each represents a methyl group, $R^3$ can be ortho, meta or para to $R'$. $Z^2$ preferably represents $SO_3H$, $R^4$ preferably represents hydrogen, $A^1$ preferably represents a phenylene or naphthylene radical carrying a second —$B^1NHR^5$ radical, $B^1$ preferably represents $SO_2$ and $R^5$ preferably represents an alkyl radical, substituted as stated, having at most 3 carbon atoms, above all, a β-sulphato ethyl or β-sulphatopropyl radical.

According to a further feature of the invention there is provided a process for manufacture of the new anthraquinone dyestuffs which comprises condensing a heterocyclic compound of the formula:

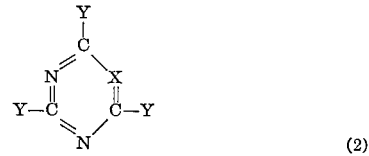
(2)

wherein X and Y have the meanings stated above, in either order, with (a) one molecular proportion of an amino-anthraquinone compound of the formula:

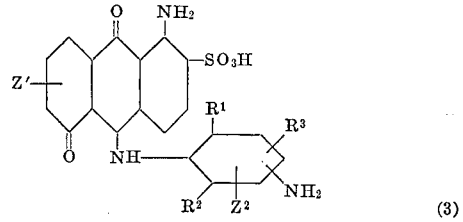
(3)

wherein $R^1$, $R^2$, $R^3$, $Z^1$ and $Z^2$ have the meanings stated above and (b) one molecular proportion of an amine of the formula:

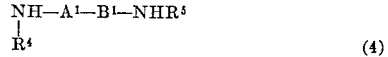
(4)

wherein $A^1$, $B^1$, $R^4$ and $R^5$ have the meanings stated above.
As examples of compounds of Formula 2 there may be mentioned cyanuric chloride, cyanuric bromide, 2,4,5,6-tetrachloro- and tetra-bromopyrimidine, 5-nitro-2,4,6-trichloro- and tribromopyrimidines and 5-cyano-2,4,6-trichloro- and tribromo-pyrimidines.

As examples of compounds of formula (3) there may be mentioned 1-amino-4-(3'-amino-2'4',6'-trimethylanilino)anthraquinone-2,5'-disulphonic acid, 1-amino-4(4'-amino - 2',3',6' - trimethylanilino)anthraquinone-2,5'-disulphonic acid, 1-amino-4(4'-amino-2',6'-dimethyl or diethyl anilino)anthraquinone-2,5'-disulphonic acids, 1-amino-4(4'-amino-2' - methyl - 6' - chloroanilino)anthraquinone-2-sulphonic acid.

As examples of amine of formula (4) there may be mentioned 4-($\beta$-chloroethylsulphamyl)-aniline, 3($\beta$-chloroethylsulphamyl)-aniline, 3,5-di($\beta$-chloroethylsulphamyl)aniline, 3- or 4-($\beta$-sulphatoethylsulphamyl)aniline, 4-($\gamma$ - chloro-$\beta$-hydroxypropylsulphamyl)aniline, 4-($\beta$,$\gamma$-dichloropropylsulphamyl)aniline, 4-($\beta$ - chloropropylsulphamyl)aniline, 4-($\gamma$-bromo-$\beta$-hydroxypropylsulphamyl)aniline, 2-methoxy-5-($\gamma$-chloro-$\beta$-hydroxypropylsulphamyl)aniline, 6-($\beta$-chloroethylsulphamyl)-2-naphthylamine, 3-($\beta$-chloro- or $\beta$-sulphatoethylsulphamyl)aniline, 2-methoxy-5-($\beta$-chloro- or $\beta$-sulphatoethylsulphamyl)aniline, 4-($\beta$-sulphatoethylcarbamyl)aniline, 3-($\beta$-chloroethylcarcarbamyl)aniline and 4-($\beta$-sulphatopropylsulphamyl)-N-methylaniline.

The above process can conveniently be carried out by suspending or dissolving the heterocyclic compound in water or a mixture of water with a water-miscible organic solvent, adding one of the other two reagents, or a solution thereof in water or a water-miscible organic solvent, stirring the mixture at a suitable temperature until one chlorine or bromine atom on the heterocyclic compound has been reacted, or substantially so, then adding the third reactant and stirring at a suitable temperature to effect reaction of the second chlorine or bromine atom. In general, a temperature of 0 to 5° C. is suitable for the first step and a temperature of 30 to 50° C. is suitable for the second step. The reaction is preferably carried out in the presence of an acid-binding agent, added at such a rate as to maintain the pH of the reaction mixture between the limits of 4 and 8.

The new dyestuffs can be isolated by any of the usual means used in connection with water-soluble reactive dyestuffs, preferably by the addition of sodium chloride, and filtering off the precipitated dyestuff and drying.

The new dyestuffs can be used for dyeing or printing a wide variety of textile materials. They are particularly valuable for use as reactive dyes for cellulose with which they are capable, in the presence of acid-binding agents, of reacting with a high degree of efficiency to give bright reddish-blue shades of excellent fastness to washing and to light.

The invention is illustrated but not limited by the following example in which parts are by weight.

EXAMPLE 1

A neutral solution of 8.85 parts of 1-amino-4-(3'-amino - 2',4',6' - trimethylanilino)anthraquinone-2-5'-disulphonic acid in 250 parts of water is added during 15 minutes to a stirred suspension of 3.75 parts of cyanuric chloride in 20 parts of acetone and 15 parts of water at 0-5° C. The pH of the mixture is maintained at 4.5-5.0 by the addition, when necesarry of 2 N sodium carbonate and stirring under these conditions is continued for a further 1 hour. The reaction mixture is then filtered, the filtrates to pH 6.4 and a neutral solution of 12.4 parts of the disodium salt of 4,8-bis-($\beta$-sulphatopropylsulphamyl) naphthyl-2-amine in 190 parts of water is added. The mixture is stirred at 35-40° C. and at pH 6.5-7.0 for 2 hours, a further 1.55 parts of the above $\beta$-sulphatopropylsulphamyl compound dissolved in 25 parts of water is added and stirring at 43-45° C. and pH 6.5-7.0 continued for 8 hours. The reaction mixture is filtered, the solution treated with 30% (w./w.) sodium chloride with stirring and the precipitated dyestuff filtered and washed with 30% (w./v.) sodium chloride solution. The product is purified by redissolving in water and reprecipitating from its solution by the gradual addition of 34% (w./v.) sodium chloride; it is finally isolated by filtration, washing with 26% (w./v.) sodium chloride solution and drying.

The product dyes cellulosic textile material in bright reddish-blue shades of excellent fastness to wet treatments and to light.

EXAMPLE 2

A neutral solution of 11.5 parts of the disodium salt 1 - amino-4-(3'-amino-2',4',6-trimethylanilino) anthraquinone-2,5'-disulphonic acid in 300 parts of water is added during 25 minutes to a stirred suspension of 4.59 parts of 5 cyano-2,4,6 trichloropyrimidine in 50 parts of dioxan and 100 parts of water at 10-15° C. The pH of the mixture is maintained at 4.5-5.0 by the addition of 2 N sodium carbonate and stirring under these conditions is continued for a further 1 hour. The reacion mixture is then filtered, the filtrates adjusted to pH 6.5 and a neutral solution of 7.5 parts of 4-($\beta$-sulphatopropylsulphamyl) aniline in 100 parts of water is added. The mixture is stirred at 55-60° C. for 6 hours whilst the pH is maintained at pH 6.0-6.5 by the gradual addition of 2 N sodium carbonate solution. 100 parts of sodium chloride are added and the mixture is allowed to stir and cool for 2 hours. The precipitated dyestuff is filtered washed on the filter with 300 parts of 25%, w./v.) sodium chloride solution, sucked dry and is finally dried in vacuo at 20° C. The product was found on analysis to contain 1 atom of hydrolysable chlorine and 3 atoms of sulphur per molecule of dyestuff and when applied to cellulosic textile materials in conjunction with an acid-binding agent yielded strong-bright reddish blue tints of excellent fastness to wet treatments and light.

The following table gives further examples of the new dyestuffs of the invention which can be obtained by the method of Example 1 by condensing the sodium salts of the anthraquinone compounds listed in column 1 with an equivalent proportion of the heterocyclic compounds listed in column 2 and reacting the compound so obtained with an equivalent proportion of the amine listed in column 3.

| Example | Anthraquinone compounds | Heterocyclic compound | Amine |
| --- | --- | --- | --- |
| 3 | 1-amino-4-(3'-amino-2',4',6'-trimethylanilino) anthraquinone-2,5'-disulphonic acid. | Cyanuric chloride | 4($\beta$-chloroethylsulphamyl)-N methylaniline. |
| 4 | 1-amino-4-(4'-amino-2',3',6'-trimethylanilino) anthraquinone-2,5'-disulphonic acid. | do | 4($\beta$-sulphatoethylcarbamyl)-aniline. |
| 5 | do | do | 4($\gamma$-chloro $\beta$-hydroxypropylsulphamyl)-aniline. |
| 6 | 1-amino-4-(3'-amino-2',4',6'-triethylanilino)-anthraquinone-2,5'-disulphonic acid. | do | 3,5 bis($\beta$-sulphatopropylsulphamyl)-aniline. |
| 7 | do | do | 3-amino-5($\beta$-chloroethylsulphamyl)-benzoic acid |
| 8 | 1-amino-4-(3'-amino-2',4',6'-trimethylanilino)anthraquinone-2-sulphonic acid. | Cyanuric bromide | 3,5 bis($\beta$-sulphatoethylsulphamyl)-aniline. |

What we claim is:
1. A reactive water-soluble anthraquinone dyestuff of the formula:

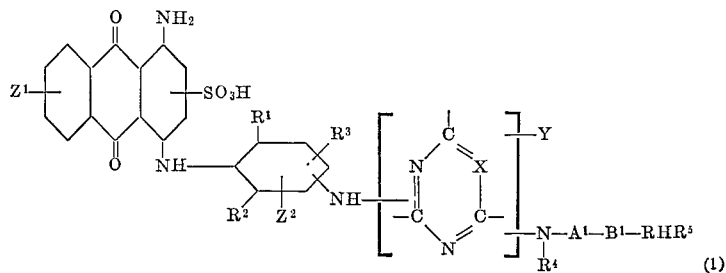

wherein $Z^1$ and $Z^2$ each independently represents H or $SO_3H$;

$R^1$ is methyl or ethyl $R^3$ represents a hydrogen atom or a methyl or ethyl or ethyl group $R^3$ represents a hydrogen atom or a methyl or ethyl group, Y represents Cl or Br;

X represents N, C—Cl or C—CN, $R^4$ represents a hydrogen atom or an alkyl group having up to 4 carbon atoms, $A^1$ represents a phenylene or naphthylene radical in which the nucleus can carry one or more substituents selected from the group consisting of phenylene, naphthylene, carboxyphenylene, phenylene containing a second —$B'NHR^5$ group and naphthylene containing a second —$B'NHR^5$ group, $B^1$ represents $SO_2$ or $CO_2$ and $R^5$ represents an alkyl group of 2 or 3 carbon atoms, having a Cl, Br or $OSO_3H$ substituent in the β-position or having both a Cl, Br or OH substituent in the β-position and a Cl or Br substituent in the γ position.

2. A dyestuff as claimed in claim 1 and represented by the formula:

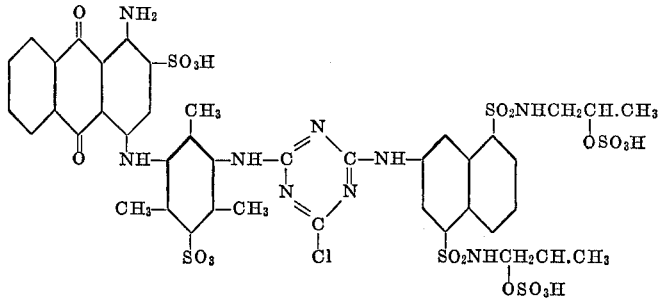

wherein Y represents Cl or Br;

X represents N, C—Cl or C—CN,

Ar represents a trivalent phenyl or naphthyl radical, and $R^6$ represents an ethyl or propyl radical having a Cl, Br or $OSO_3H$ substituent in the β-position or having both a Cl, Br or OH substituent in the β-position and a Cl or Br substituent in the γ position.

3. A dyestuff as claimed in claim 2 wherein $R^6$ represents β-sulphatoethyl or β-sulphatopropyl.

4. The anthraquinone dyestuff of the formula:

References Cited

UNITED STATES PATENTS 3,133,921  5/1964  Brassel et al. _____ 260—249
3,397,207  8/1968  Barben et al. _____ 260—249
3,427,308  2/1969  Barben et al. _____ 260—249 XR HENRY R. JILES, Primary Examiner J. M. FORD, Assistant Examiner U.S. Cl. X.R.

8—40; 260—256.5